United States Patent [19]
Barth et al.

[11] Patent Number: 4,860,848
[45] Date of Patent: Aug. 29, 1989

[54] APPARATUS FOR ACTUATING THE THROTTLE VALVE OF AN INTERNAL COMBUSTION ENGINE

[75] Inventors: Guenter Barth, Korntal-Munch.; Alwin Stegmaier, Schwieberdingen; Anton van Zanten, Ditzingen, all of Fed. Rep. of Germany

[73] Assignee: Robert Bosch GmbH, Stuttgart, Fed. Rep. of Germany

[21] Appl. No.: 199,884

[22] Filed: May 27, 1988

[30] Foreign Application Priority Data

Jun. 10, 1987 [DE] Fed. Rep. of Germany ....... 3719323

[51] Int. Cl.$^4$ .................. B60K 28/16; B60K 26/00; F02D 9/02; F02D 11/02
[52] U.S. Cl. .................................. 180/197; 123/336; 364/426.03
[58] Field of Search ............... 180/197; 364/426.03; 123/336

[56] References Cited

U.S. PATENT DOCUMENTS

| 3,627,074 | 12/1971 | Burckhardt | 180/197 |
| 3,802,528 | 4/1974 | Leiber | 180/197 |
| 4,416,347 | 11/1983 | Bertling | 180/197 |
| 4,703,823 | 11/1987 | Yogo et al. | 180/197 |

FOREIGN PATENT DOCUMENTS 3323563 1/1985 Fed. Rep. of Germany .
2142449 1/1985 United Kingdom .

Primary Examiner—Kenneth R. Rice
Attorney, Agent, or Firm—Edwin E. Greigg

[57] ABSTRACT

An apparatus for actuating the throttle valve of an internal combustion engine, in particular a drive slip control (ASR) and engine drag moment control (MSR), with a disconnect point disposed in the course of the gas pedal transmission linkage overcome by spring forces acting on both sides of it. In the normal situation the throttle valve position corresponds to the driving pedal position, while in attaining ASR functions the disconnect point is opened, by the action of an electromagnetic or electric-motor element, and the position of the throttle valve is adjusted independently, regardless of the intention of the operator, in order to reduce the drive slip.

31 Claims, 6 Drawing Sheets

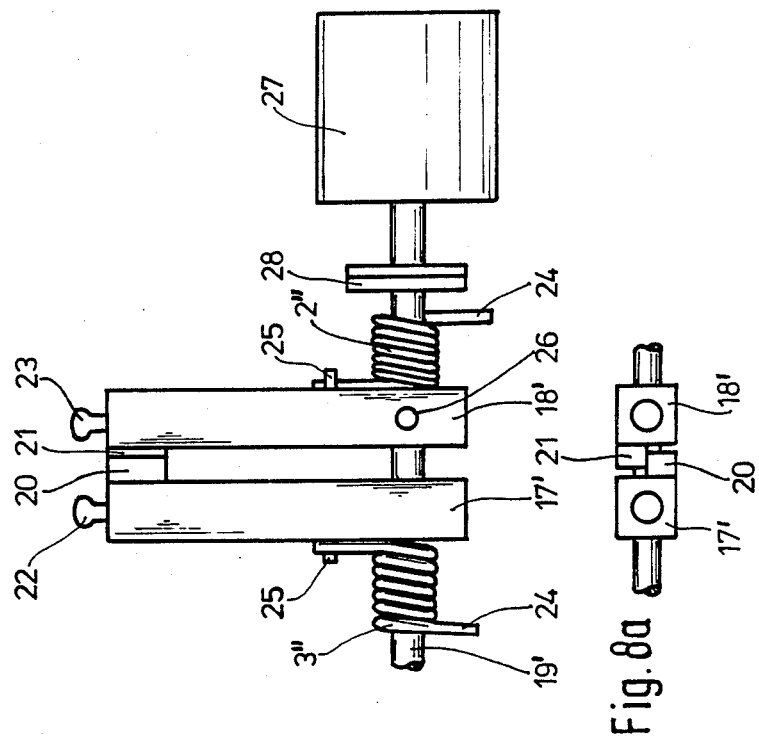
Fig. 8
Fig. 8a
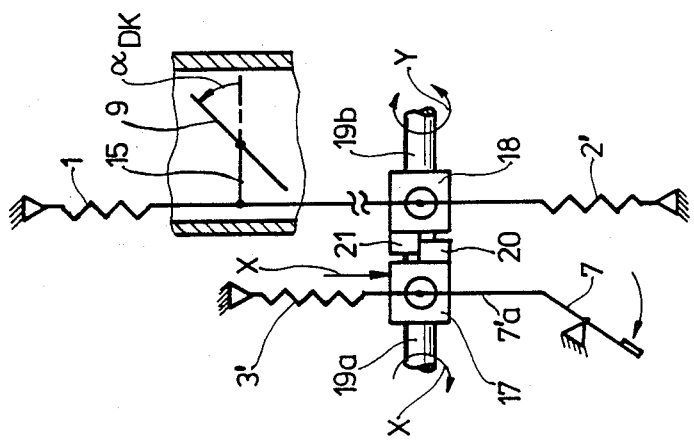
Fig. 7

Fig.11

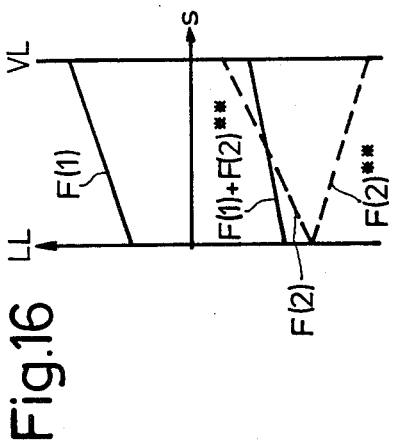
Fig.16
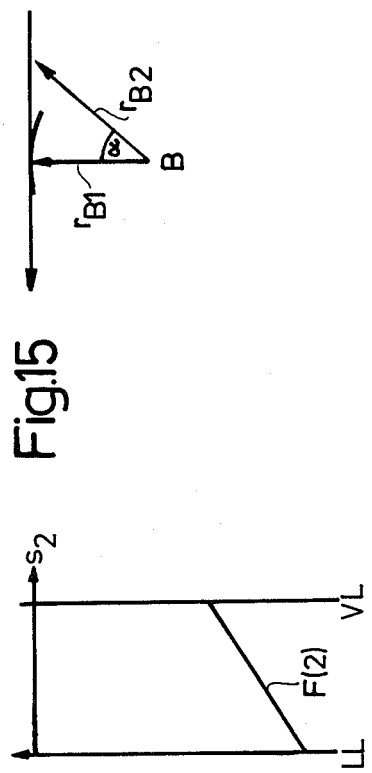
Fig.15
Fig.14
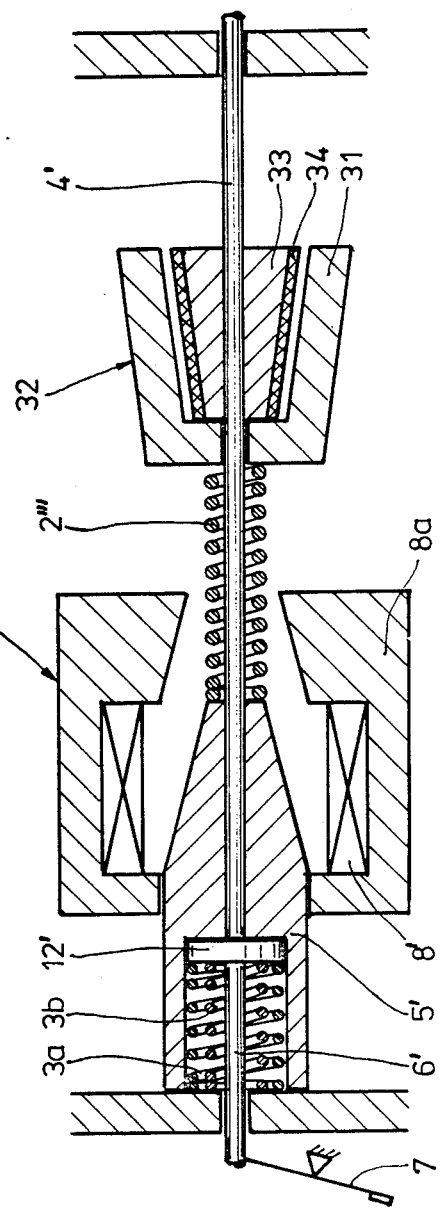
Fig.17

APPARATUS FOR ACTUATING THE THROTTLE VALVE OF AN INTERNAL COMBUSTION ENGINE

BACKGROUND OF THE INVENTION

The invention is directed to improved apparatus for actuating the throttle valve of an internal combustion engine. A known apparatus of this type includes a hydraulic cylinder disposed in the course of the linkage between the gas pedal and throttle valve, or other components with which the power output by an internal combustion engine can be varied. In the normal situation, this hydraulic cylinder is moved along with the throttle valve actuation, and it enables a deviation or difference in travel between the adjusting movement at the gas pedal and the adjustment of the throttle valve as a result of the fact that selectively, either the hydraulic cylinder is acted upon with suitable pressure of a pressure medium, or pressure is bled off (such as shown in German Offenlegungsschrift 33 23 561; and U.S. Pat. 4,415,347). Such hydraulic cylinders are typically also provided in systems having anti-skid or anti-lock brake systems (ABS), and they result from an expansion of the basic functions of such systems, in which suitable brake force modulations are performed, by action on the wheel brake cylinders or systems preceding them, not only whenever the wheels of the vehicle lock during braking but also whenever the wheels threaten to spin during acceleration, for example in fast starts as well as in normal starts on a slippery surface. The signals provided by the existing wheel sensors can then also be utilized for this kind of drive slip regulation (ASR), in which case signals from the brake pedal and driving pedal (gas pedal) should also be taken into account.

ASR control is possible not only by exerting a braking action upon spinning wheels, but also by reducing the engine power output, or in other words by retracting the throttle valve position, thereby lessening the tendency of the driven wheels to spin, regardless of the intention of the driver and regardless of the actual position of the driving pedal.

Such pressure-dependent hydraulic cylinders, which are primarily moved along with the linkage, can be complicated and difficult to incorporate in the connecting linkage between the gas pedal and the throttle valve actuation means, because at least one pressure connection must be present in any case, and furthermore, a reverse actuation course through the switching systems, or in other words accelerating variably hard, is not possible in certain cases, such as when the gas pedal is in the idling position.

OBJECT AND SUMMARY OF THE INVENTION

It is accordingly an object of the invention to devise a throttle valve adjuster that is usable without requiring hydraulic or pneumatic pressure connections, one which is triggerable directly by electrical signals, and which normally spans a disconnect point in the course of the throttle valve actuation, and that is also accessible to expanded trigger functions, that is, both an exaggerated opening of the throttle valve and a closure of the throttle valve, regardless of the intention of the operator.

The apparatus according to the invention attains this object with the characteristics revealed herein and has the advantage of a simple design, a sturdy construction, and not having to generate a hydraulic or pneumatic adjusting medium pressure. It enables a throttle valve modulation derived directly from electrical adjusting signals supplied to an electromagnetic drive unit (linear adjuster) or an electricmotor drive unit (rotary throttle valve adjuster).

For performing ASR functions and/or MSR functions (MSR=motor drag moment control), its dimensions allow the throttle valve adjuster to be installed at any arbitrary point between the driving pedal and throttle valve, and both the disengagement from the driver's intention and an independent throttle valve reduction in the ASR situation, or throttle valve opening in the MSR situation, are spontaneously possible, at any time.

Advantageous further provisions of and improvements to the apparatus defined will be best understood by a perusal of this specification. If the throttle valve adjuster is embodied as an electromagnetic actuation element, in the simplest case comprising an armature movably supported in the magnetic field of an exciter coil, then the disconnect point can be defined such that a biasing spring (opening spring) acting in the opening direction of the throttle valve acts upon the armature, which is suitably connected (by linkage or a Bowden cable) to the throttle valve actuation. The disconnect point is embodied by a linkage element contacting the armature from the vicinity of the driving pedal actuation; the contact of the two parts is secured by a further spring, which presses the linkage element against the armature and in so doing also overcomes the force of the throttle valve opening spring, so that in the outset state, the throttle valve is closed. The interplay of these two springs includes still another throttle valve spring, typically directly engaging a lever for throttle valve adjustment, and this further spring likewise has the effect of moving the throttle valve into its closing position.

Thus the operative spring forces positively overcome the disconnect point at any driving pedal position.

By suitably triggering the electromagnetic element, however, it is possible, at any driving pedal position, beginning with the idling position, to open the disconnect point and to move the throttle valve into a more or less closed position. Preferably, the armature of the electromagnetic final control element is embodied as a permanent magnet, so that a linear force rise or fall occurs when the coil current is increased or decreased. This coil current is generated by a logical control circuit or the like, which reacts to adjusting signals supplied to it; some of these signals may be obtained by utilizing the sensors already present in any event when ABS control is provided. Action is then exerted upon the permanent magnet/armature such that it lifts from its counterpart component in the disconnect point region and then effects the adjustment of the throttle valve position independently of the driver's intention. After the armature is disconnected from its counterpart component, embodied by the spring plate of a tie rod, the armature, the exciter coil in the field of which the armature is located and the other springs participating in this adjustment (the opening spring and the throttle valve restoring spring) then act as current-proportional throttle valve travel and angle adjusters.

This apparatus has two particular advantages. The first is that in ASR operation, the driver cannot disrupt the control by changing the driving pedal position on his own. If this change in driving pedal position is in the direction of "more gas", there is no feedback effect on the ASR control. Contrarily, if the change in driving pedal position is in the direction of "less gas", the driver's wishes are respected, as long as the gas pedal position is below that of the ASR position, or in other words, at this gas pedal position the wheels are no longer spinning. On the other hand, if the gas pedal position is not below that of the ASR position, then the ASR control is unaffected by the movement of the gas pedal.

The second advantage is that the action of the throttle valve adjuster, because of the varying force at the drive pedal, informs the driver that he has overaccelerated. This change in force presses the driver's foot back in the direction of less acceleration.

In another exemplary embodiment, the opening of the disconnect point is effected by a rotary throttle valve adjuster, which engages a lever connected to the throttle valve linkage; via a cam system, this lever can also cooperate with a further lever, against which it is biased by spring forces acting on it on both sides. The other lever receives its actuation, which corresponds to a rotation, from the region of the driving pedal adjustment. Since the camlike protrusions connecting the two levers form a form-fitting system in only one rotational direction, the lever connected to the throttle valve linkage can lift away from the first lever, under the influence of a motor-driven rotary adjuster, and effect the desired throttle valve reduction (ASR function). An MSR function, contrarily, means an opening of the throttle valves (DK) counter to the driver's intention, the permanent magnet then rests on the linkage element (spring plate), and no disengagement takes place.

Finally, in the actuation for opening the throttle valve in MSR function or closing it in ASR, it is also possible to attain a gentle summational spring characteristic curve from the opening spring and the throttle valve spring by lending the opening spring the effect of a negative spring characteristic. With a rotary adjuster, this can be done by using a cam plate with various actuation radii that is engaged by an opening spring having a normal spring characteristic. To attain a negative spring characteristic, a magnetic force storage means can also be used. A gentle summational spring characteristic curve of this kind counteracts the otherwise unavoidable steepening of the total spring characteristic on the throttle valve side of the disconnect point, so that a smaller closing spring can also be used in the vicinity of the driving pedal actuation. Moreover, the force brought to bear by the linear or rotary adjuster need not increase along with the adjuster travel.

The invention will be better understood and further objects and advantages thereof will become more apparent from the ensuing detailed description of preferred embodiments taken in conjunction with the drawings.

BRIEF DESCRIPTION OF THE DRAWINGS

FIG. 1a schematically shows the electric or electronic control unit for acting upon the electromagnetic final control element of the throttle valve adjuster;

FIG. 7 schematically shows the basic design of a further exemplary embodiment of the present invention, with a rotary adjuster for throttle valve actuation, which is disposed between the driving pedal and the throttle valve to embody an adjuster;

FIG. 8, in greater detail, shows the embodiment of a rotary adjuster having associated, cam-coupled levers for a linkage adjustment;

FIG. 8a is a schematic view of the embodiment shown in FIG. 8;

FIG. 11 shows spring characteristic curves of the throttle valve spring, the real opening spring and the desired opening spring (negative characteristic curve course) for attaining a gentle summation spring characteristic curve;

FIG. 14 shows the characteristic curve course of the real opening spring used, with realization of an overall negative spring characteristic curve;

FIG. 15 schematically shows variable radii of the cam plate that are used to attain the negative spring characteristic curve course;

FIG. 16 is a diagram which shows the course of spring characteristic curves of the throttle valve spring, a real opening spring and a desired opening spring, with a magnetic force originating in a magnetic force storage means and acting in the direction of opening the throttle valve; and, FIG. 17 schematically shows an exemplary embodiment of a linear adjuster, with an overall gentle summation spring characteristic curve for opening the throttle valve, in which a magnetic force storage means of the aforementioned kind is used.

DESCRIPTION OF THE PREFERRED EMBODIMENTS

The basic concept of the present invention is to disconnect the connection between the driving pedal and the throttle valve at a suitable point, or in other words to provide a disconnect point, to span this point by operative spring forces and magnetic forces or in other words to close this point in a positive manner. Also, to provide means that are capable of rescinding this accordingly generated positive engagement in the linkage course and therefore effect arbitrary throttle valve adjusting movements, as a function of supplied electrical signals but independently of the driver's intention, or in other words of the position of the driving pedal. Suitable drive means may, for example, be either a linear or a rotary adjuster.

Figure 1:
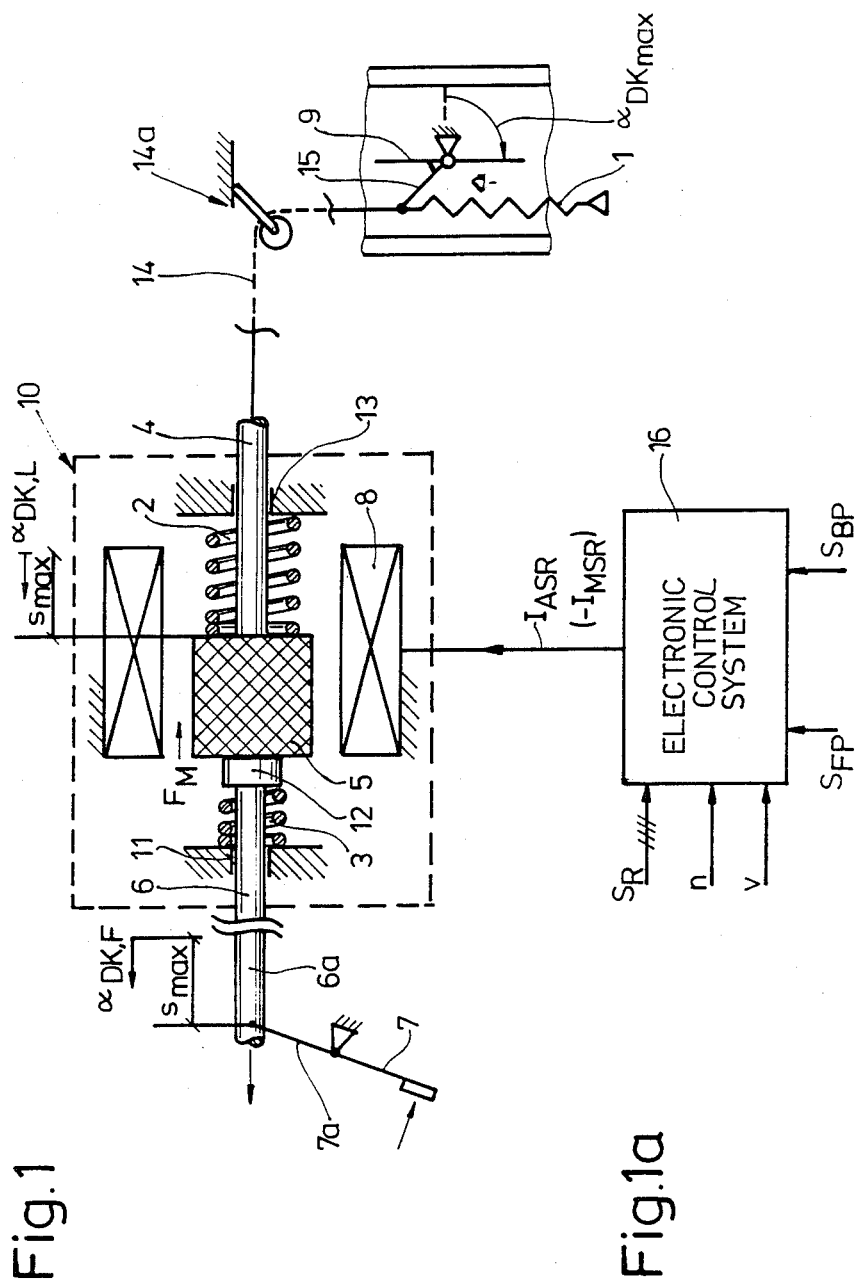
FIG. 1 schematically shows a basic design of a linear throttle valve adjuster, disposed between the schematically shown driving pedal and the part of the intake tube of an internal combustion engine containing the throttle valve.

One such linear throttle valve adjuster is embodied as a disconnection and electromagnetic actuation element and is shown at 10 in FIG. 1, where it is represented by a boundary of dashed lines. The linear throttle valve adjuster 10 may be located at an arbitrary point between the actuation region of the driving pedal and a linkage associated with the throttle valve 9, and as a counterpart component to an armature, in the preferred form as a permanent magnet 5, it includes a connecting element 6, which is supported in a sliding guide 11 and may also be directly a part of the connecting rod 6a pivotably connected to the driving pedal linkage 7a.

In FIG. 1, the elements are shown in their position of maximum deflection (fully depressed position of the driving pedal), in which the largest opening angle $\alpha_{max}$ is also present, corresponding to the maximum travel deflection $s_{max}$ of the throttle valve adjuster components.

The counterpart component 6 extending to the permanent magnet 5 includes a spring plate 12 that is directly in operative connection with, or in other words is arranged to directly contact the permanent magnet 5. A driving pedal restoring spring 3 which acts upon the counterpart component 6, as already mentioned, may be directly a part of the driving pedal connecting rod 6a.

The permanent magnet 5 is located in the zone of influence of an electromagnet coil 8, and thus forms with it an electromagnetic final control element having the tendency that at maximum coil current, the permanent magnet 5 can be drawn into the coil 8 so far that the throttle valve is in the idling position, at which position it generates a magnetic force $F_M$. The initial final control element of the linear throttle valve adjuster 10 is disposed on the permanent magnet 5 and is likewise shown as a connecting rod 4 that is guided in a sliding guide 13. Acting upon the permanent magnet 5 is a compression spring 2 that in the ASR situation urges the permanent magnet 5 in the direction counter to the magnetic force $F_M$ acting upon the permanent magnet from the coil, or in other words tends to displace the permanent magnet in the direction for opening the throttle valve, that is, keeping it in contact with the spring plate 12 of the counterpart component 6. This applies for the ASR situation, in which the magnetic force $F_M$ has this direction. In the MSR situation, the magnetic force acts in the opposite direction, that is, with the force of the compression spring 2. The output of the connecting rod 4 can be arbitrarily connected with some possible means of throttle valve adjustment. In the exemplary embodiment shown, a Bowden cable 14 is schematically shown, which engages a lever 15 connected to the throttle valve 9; a tension spring 1 is at the same time pivotably connected to the lever and applies a force in the opposite direction and tends to return the throttle valve 9 to its outset position (closed; engine idling). At 14a, another possibility of deflecting the Bowden cable course is shown, so that the connections of the various components thus formed correspondingly apply, and the basic function of the throttle valve adjuster becomes apparent.

In the following section, the various spring actions on the components of the throttle valve adjuster will now be described, referring to the diagrams in FIGS. 2–6.

Figure 2:
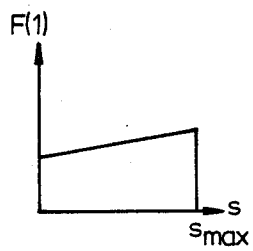
FIG. 2 shows the course of the spring characteristic, in the form of spring force plotted over the deflection (travel s) of a throttle valve restoring spring.

The spring force characteristic F(1) of the throttle valve restoring or tension spring 1 is shown in the diagram of FIG. 2; with increasing deflection up to the throttle valve angle $\alpha_{DK}=90°$, the spring force increases only slightly.

Figure 3:
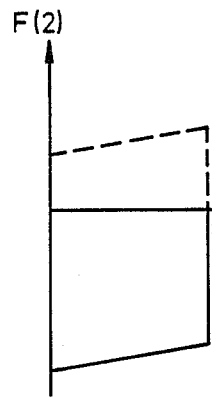
FIG. 3 shows the course of the spring characteristic of a compression spring acting upon the position of the permanent magnet in the throttle valve adjuster.
Figure 4:
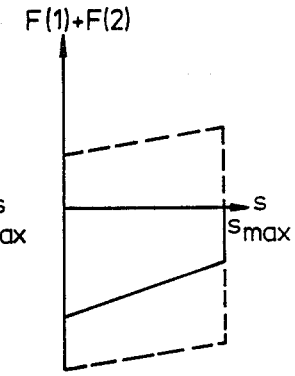
FIG. 4 shows the sum of the spring forces of the throttle valve restoring spring and compression spring, plotted over the deflection.

FIG. 3, in the form of a similar diagram, shows the now opposed spring force course F(2) of the compression spring 2, which acts upon the permanent magnet 5 counter to the throttle valve restoring spring. FIG. 4 then shows the total effect of the spring forces F(2)+F(1). It will be appreciated that, if only these two spring forces are taken into consideration, the force of the compression spring 2 predominates, and so pulls the throttle valve 9 into its open position.

Figure 5:
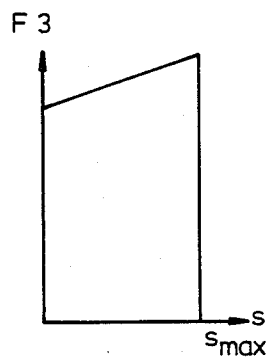
FIG. 5 shows the course of a spring force of a driving pedal resotring spring.
Figure 6:
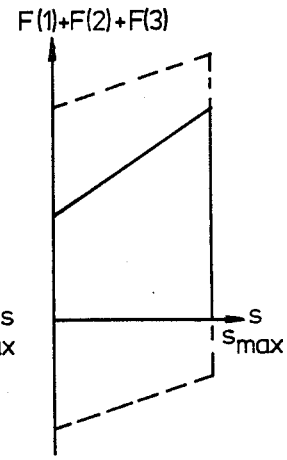
FIG. 6, also in the form of a diagram, shows the sum of all the springs acting upon the position of the throttle valve adjuster elements and finally on the position of the throttle valve.

FIG. 5 now shows the course of the spring force F(3) of the driving pedal restoring spring 3, which is comparatively forceful, so that the sum of the spring forces F(3)+F(2)+F(1) shown in FIG. 6 shows a total spring force (positive action) acting upon the throttle valve 9. At the same time, it is apparent that because of the action of these spring forces, the contact point that exists between the permanent magnet 5 and the spring plate 12 of the connecting rod extension 6 is connected in the sense of being spanned, and these two parts are positively pressed against one another.

The diagram course of FIG. 6 nowhere intersects the spring force zero line (abscissa), so that in any actuation position of the driving pedal 7 from a zero deflection to a deflection of $s_{max}$, the two parts 5 and 12 contact one another, and an unaffected throttle valve adjusting movement in the normal situation is therefore possible.

The mode of operation of the throttle valve adjuster, the basic design of which is described above, is such that with the adjuster, a throttle valve angle $\alpha_{DKL}$ that is less than or equal to the throttle valve angle $\alpha_{DKF}$ specified by the driver can now be set. The maximum deflection shown in the drawing for the throttle valve components that may be connected with the driving pedal and throttle valve, via linkages, Bowden cables or other connecting means, is equivalent to a throttle angle $\alpha_{DK}=90°$. The restoring force of the throttle valve spring 1, which in this case is fully deflected, acts via the connection 14 and 4 upon the permanent magnet 5, which is also acted upon by the force of the compression spring 2.

The springs acting upon the overall system may intrinsically be embodied arbitrarily and with arbitrary pivotable connection with the components, but on the condition that when no pressure is being exerted on the driving pedal 7 and no force is being exerted on the permanent magnet, the throttle valve is closed by spring action, and the parts 5 and 12 are in contact with one another.

If there is an ASR function (drive slip control), then a throttle valve positon should be set that is less than the throttle valve position indicated by the driver. This is attained by means of a suitably dimensioned electric current in the coil 8, causing the permanent magnet to introduce a supplementary force $F_M$ into the system of springs 1, 2 and 3. A disconnection of the permanent magnet 5 from the components 6a, 6, 12 takes place whenever the magnetic force $F_M$ generated by the coil 8 is greater than a sum of the spring forces F(2) and F(1)—the pressing force—that is dependent on the throttle valve position. In the disconnection, the force of the spring 3 is not taken into account, because it is restrained by the depressed driving pedal 7 in any case and is therefore equalized. The final result after disconnection of the permanent magnet 5 from the connecting rod 6a of the driving pedal 7 is an unequivocal association between the generated magnetic force $F_M$—that is, the current flowing through the coil 8—and the throttle valve angle $\alpha_{DK}$. This current $I_{ASR}$ can therefore be regulated, and the corrresponding associated electric or electronic control system, shown at 16 in FIG. 1a, therefore recognizes—aside from solid friction—the throttle valve deflection caused by the current, and can limit this deflection to suitable values.

Therefore if the coil 8 is supplied with the current $I_{ASR}$ for drive slip control in a given direction, then the resultant magnetic force $F_M$ generated can move the throttle valve only in the closing direction, or in other words close it to a greater extent, as compared with the position dictated by the driver (ASR function).

On the other hand, if the driving pedal is not being actuated by the driver or if it is retracted (suddenly) in the transition to engine idling, a socalled MSR function can be attained by means of a magnetic force in the direction opposite that of the foregoing instance (that is, $-F_M$ in this instance). In this instance, at a desired throttle valve angle, the spring force to be overcome by the magnetic force $-F_M$ results from the summation characteristic curve of the characteristic curve course shown in FIG. 6 for the three springs 1, 2 and 3. MSR control of this kind is understood to mean regulation of the engine drag moment, so as to limit or reduce the drag moment generated by the engine, and is for example directed to the situation in which, with the driving pedal retracted to the idling position, the engine is driven by the wheels (during vehicle braking) or in other words "dragged", until the rpm of the input shaft of the transmission has dropped to the actual engine idling rpm. Engine drag moment control of this kind is useful if braking is done on a slippery surface while the engine is engaged, because in such a case slip occurs at the drive wheels connected to the engine; this can also occur when letting up on the gas while driving over ice. To prevent such slip, engine drag control (MSR) functions in the manner of a (careful) acceleration, or in other words attempts to open the throttle valve, and therefore the magnetic force to be generated by the coil 8 for an MSR function is opposite that generated for attaining ASR functions. A reverse magnetic force of this kind can be generated by a current flowing through the coil 8 in the opposite direction. For certain control tasks in connection with the aforementioned ASR and MSR functions, it can be important to recognize the throttle valve position, and if this cannot be derived from the current flowing through the coil 8—for example, if upon gas pedal actuation the permanent magnet 5 has not lifted away from the connecting rod 6a or the components connected to it—then the throttle valve position can be determined in some other manner, such as from the position of the permanent magnet 5. If should be noted that the electric or electronic logic or control circuit 16 that generates the control current $I_{ASR}$ or $-I_{ASR}$ for the electromagnetic element in the throttle valve adjuster may be of any arbitrary design; the input signals needed include, among others, signals $S_R$ (as in ABS control) deriving from wheel sensors; engine and vehicel speed signals n and v, respectively; and, in order to distinguish between actuation of the brake and actuation of the vehicle driving pedal, brake pedal or driving pedal position signals $S_{BP}$ and $S_{FP}$, respectively, which may also be simple brake pedal or driving pedal switching signals. The electronic logic circuit 16 functions as in ABS control and hence functions on the basis of the same electric or electronic control components as in the known systems mentioned at the outset above, so that it need not be described in further detail here. It will be understood, however, that the individual components and modules may be realized in analog, digital or hybrid technology, or preferably may be combined in whole or in part to comprise corresponding areas of program-controlled digital systems, for instance with microprocessors or microcomputers. In any event, the control circuit 16 generates a current for an ASR function such that the slip values of the driven wheels, measured by the sensors and supplied as wheel rotation signals $S_R$, are lowered. As soon as this has been ascertained, the current $I_{ASR}$ through the coil 8 is reduced once again. The same logically applies to the attainment of MSR functions, except that by supplying a current $-I_{ASR}$, or in other words in the negative direction, acceleration is carefully performed, in such a way as to prevent engine drag moment from deleteriously causing slip at the driven wheels.

While the foregoing exemplary embodiment related to a linear throttle valve adjuster (linear adjuster), the following exemplary embodiments relate to rotary throttle valve adjusters (swivel adjusters) for the attainment of ASR and MSR functions, since with an opening spring 2 that develops a force vector in the direction of opening of the throttle valve and with a closing spring 3, the principle on which the invention is based, to provide disengagement options for a point in the course of the throttle valve actuation by the driving pedal, is attainable with not only a linear adjuster but with a rotary adjuster as well.

In the following exemplary embodiments, elements that are identical and have identical functions are identified by the same reference numerals, while components having the same function are provided with the same reference numerals and a prime.

FIG. 7 shows the basic design of a rotary throttle valve adjuster, in which two levers 17 and 18 are rotatably or pivotably supported by a shaft, or optionally by two shafts 19a, 19b rotating independently of one another and then suitably are disposed coaxially. By means of overlapping protrusions 20, 21 oriented toward each other, the disconnect point (disengagement possiblity) is formed, preferably at the ends of the levers, since the one lever 17 is driven by the driving pedal, for example via a Bowden cable connection or a linkage 7a', as shown in FIG. 7, or by transmission of a suitable rotary motion to the shaft 19a supporting it and to which it is secured. The closing spring 3' that brings to bear a force vector in the direction of closure of the throttle valve, and that likewise acts upon the lever 17, then operates in the opposite direction, as usual.

The basic design is augmented by the opening spring 2', which engages the lever 18 and develops a force vector in the opening direction of the throttle valve, and the throttle valve restoring spring 1, which is also present in this form in the linear adjuster of FIG. 1. All these springs, 1, 2' and 3', are tension springs, with spring characteristics that will be described in greater detail below, but which basically act as in the linear adjuster of FIG. 1; that is, the opening spring 2' overcomes the force of the throttle valve restoring spring 1 in any position of the throttle valve, and assures that the protrusion 21 always contacts the protrusion 20. Actuation of the driving pedal 7 then causes the lever 17 to pivot in the direction of the arrow X, or to rotate partially as indicated by the arrow X', whenever the driving pedal motion engages the shaft 19a; this overcomes the force of the closing spring 3', and the opening spring 2' assures that in the normal situation, the lever 18 follows the pivoting motion of the lever 17 and that the cam or protrusion 21 is therefore in contact with the cam or protrusion 20.

If an ASR or MSR function becomes necessary, then the lever 18 is driven independently of the position of the lever 17, for example with the lever 18 firmly seated on the shaft 19b, so that at this shaft, a rotary throttle valve adjuster causes rotation in one or the other direction of the double arrow Y, depending on the desired function.

FIGS. 8 and 8a show a more detailed exemplary embodiment for a throttle valve modulation in ASR or MSR operation with a rotary adjuster, preferably for use in vehicles having a linkage-actuated throttle valve. The linkage leading to the driving pedal is then pivotably connected to the lever 17', preferably at a mushroomlike extension 22 disposed on the lever end, while the linkage leading to the throttle valve is pivotably connected to an identical extension 23 on the lever 18'. The closing and opening springs 2" and 3" that keep the cams or protrusions 20, 21 in contact with one another may advantageously also be embodied as torsion springs, as shown in FIG. 8; they are then supported on the housing of the adjuster with their first extensions 24 at the end, and with their other extensions on the end and resting on stops 25 of the levers, they act in the opposite direction upon the levers 17', 18'.

In the exemplary embodiment shown, it may be advantageous for the lever 17' to be seated loosely on the shaft 19', while the lever 18' is connected to the shaft, for example by a fastening cotter pin 26. The spring force exerted by the torsion springs on the two levers 17', 18' guide these levers positively against one another, via the camlike protrusions 20, 21 and an ASR function can be performed whenever a force comes to act upon the lever 18', so that the throttle valve can be closed to a more exaggerated extent than is to be expected from the action of the driver upon the driving pedal 7 and hence upon the lever 17'.

To this end, a suitable motor-type rotary drive is provided, that is, a motor 27, preferably with a stepdown gear, which acts upon the shaft 19' and hence upon the lever 18' via a coupling 28. The coupling 28 is advantageously used here so that the driving pedal does not necessarily move the motor 27 and gear along with the throttle valve in normal throttle valve movement.

The principle, the design of spring characteristics for the torsion springs 3" and 2", as for the tension springs 3' and 2' (with respect to the travel at the lever end) should be like the spring characteristics described above for the linear adjuster.

Figure 9:
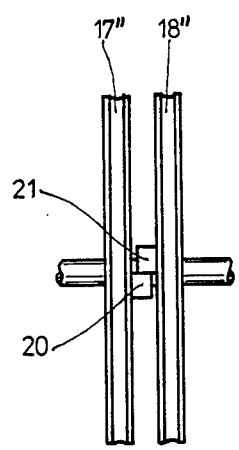
FIG. 9 in the form of a detail, shows, instead of the lever actuation, the coupling of the disconnect point via cam-coupled, cam plates suitable for a Bowden cable adjustment.
Figure 9A:
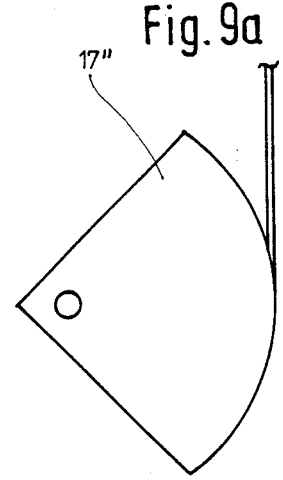
FIG. 9a is a side view of one of the cams in FIG. 9.

In the structure of FIG. 9, if the throttle valve actuation, in certain vehicles, is effected via Bowden cables, or if Bowden cables in any case are used in the vicinity of a certain transmission segment, then instead of the levers, cam plates 17''', 18''' can also be used, preferably in the form of circular segment portions as shown on the right in the view of FIG. 9a, which advantageously also makes it possible to perform a uniform step-up, if desired.

In a disengagement possibility between the driving pedal actuation and the throttle valve movement, created by the present invention with the aid of two springs acting contrarily upon the disconnect point, namely an opening spring and a closing spring, a further aspect may be significant, that is, that an overal gentle summation spring characteristic curve is desirable for opening the throttle valve.

Figure 10:
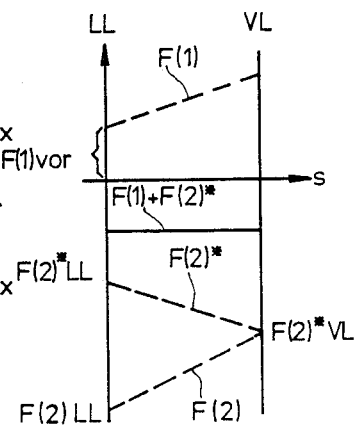
FIG. 10 shows in the form of a diagram, the course of the spring characteristic curves of the throttle valve spring and opening spring.

Considering now FIGS. 10 & 11, in principle, the opening spring 2, 2', 2" must have a greater force $F(2)VL$ in the relaxed state, that is, with the driving pedal 7 fully depressed and correspondingly at the full-load positoin VL of the vehicle, than the throttle valve restoring spring 1 in the full-load position in which it is then tensed; this force is $F(1)max$; that is, the pressing force must not become zero.

Furthermore, the summation characteristic curve of the opening spring 2 and throttle valve spring 1 (in the following discussion, these springs will be identified merely by their basic reference numerals, without a prime, since the statements made are applicable to all the spring types in the exemplary embodiments of FIGS. 1, 7 and 8) at full load VL should still have a bias, which is on the order of magnitude of the bias of the throttle valve spring in the relaxed state, that is, referred to the corresponding engine function at idling LL. This throttle valve spring bias (relaxed state for idling LL) will hereinafter be indicated by the symbol $F(1)vor$.

Form this, the biasing force $F(2)$ of the spring 2, which is attained at full load VL (that is, the relaxed state of this spring), becomes $F(2)VL \approx F(1)vor + F(1)max$.

These relationships are illustrated in the form of a diagram for the pressing force in FIG. 10, with the individual spring forces being indicated on the spring characteristic curves, and the respective extreme positions that the springs can assume also being shown, that is, idling LL (throttle valve closed) and full load VL (throttle valve fully open), which on the other hand means that in the state LL the throttle valve restoring spring 1 is in its maximally tensed state. Since the forces of the springs 1 and 2 act in opposite directions, the course of the characteristic curve of the spring 2 is in the negative range in the diagram of FIG. 10 and ensuing diagrams. The developed spring force becomes increasingly negative from the relaxed position at VL to position LL.

If the throttle valve spring 1 and the opening spring 2 are connected in series, then as the summation characteristic curve $F(1) + F(2)$ of the two springs in the diagram of FIG. 10 shows, an undesirable steepening occurs, finally resulting in a correspondingly "stiffer" spring, which means that over the spring travel, the springs force it brings to bear is varied severely.

The force of the spring 3, 3', 3" must be designed in view of this "summation spring" in such a way that in the relaxed state (LL), it exceeds the forces of the springs 1 and 2—the pressing force. This can cause undesirably great pedal forces.

The levers 17, 18, 17', 18', or the elements of the disconnect point of the linear adjuster, are braced against one another with a force, the pressing force, in accordance with the summation characteristic curve $F(1) + F(2)$ of the springs 1 and 2 (and naturally of the springs 1 and 2' as well as 1 and 2"), and this force must be overcome if there is an ASR intervention. Hence, the attempt must be to design this force as being as low as possible, or in other words to reduce it to the minimum necessary bias.

As shown in FIG. 11, a reduction of this kind, that is, the attainment of this kind of gentle summation characteristic curve, can be attained by making a desired summation curve of the spring forces F(1)+F(2) constantly equal, over the spring travel, to the spring force of the throttle valve spring 1 in the relaxed state, that is, equal to F(1).

Figures 12, 13:
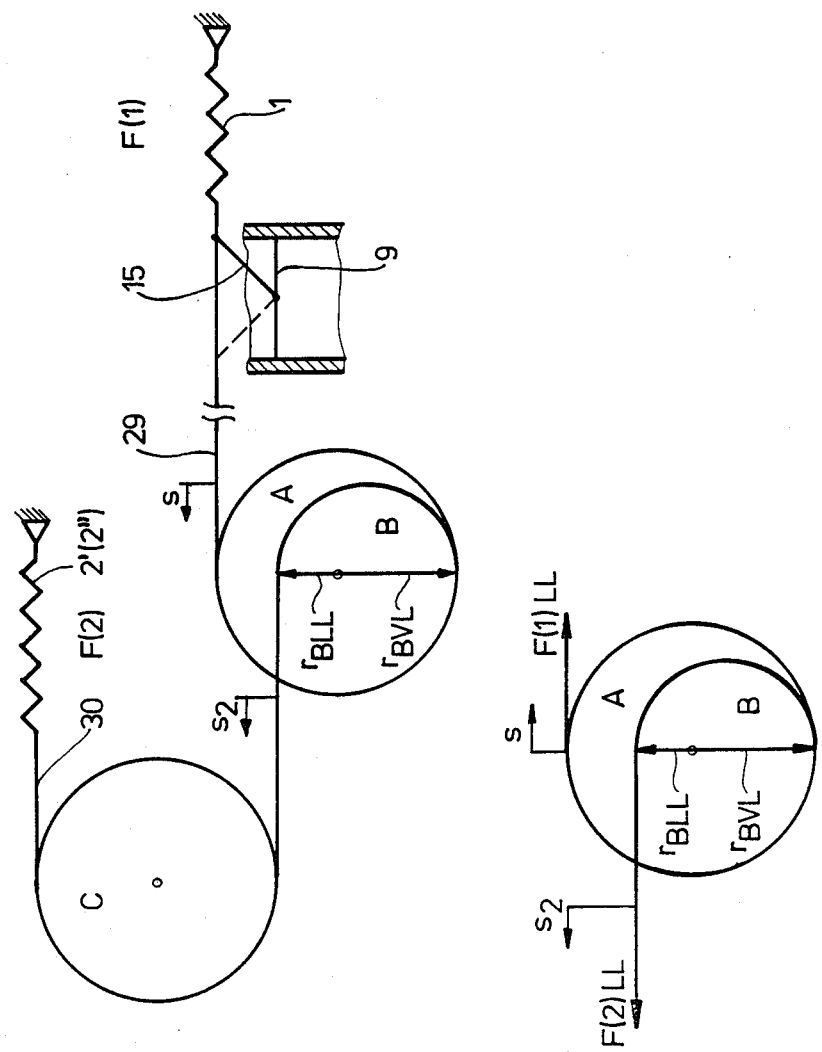
FIG. 12 shows the basic form of linking a real opening spring via a transmission means including a cam plate, so that the overall effect is that of a negative spring characteristic curve.
FIG. 13 shows the forces for the idling throttle valve position that engage the cam plate and a further transmission plate coupled to it.

This novel course of the summation curve is shown as F(1)+F(2)*, and such behavior can be attained by using a negative spring characteristic curve for the opening spring F(2), which is therefore symbolized as F(2)* in the diagram of FIG. 11. This kind of negative spring characteristic curve is attainable, for example:

(a) in the rotary adjuster by using a cam plate having a varying radius, as shown in FIG. 12, or by means of a swivel magnet, and (b) in the exemplary embodiment of a linear adjuster, by using a (further) magnet, as shown in detail in FIG. 17. This latter provision will be described in further detail herinafter.

To attain this kind of negative spring characteristic curve with a cam plate, where as can be assumed at the outset a normal opening spring 2 can be used as a tension spring having a spring force that increases from the relaxed to the tensed state, the procedure is in accordance with the exemplary embodiment of FIG. 12. In this procedure, the (circular) plate A can correspond to the lever 18', or still better the plate 18'', or the corresponding plate segment, by way of which the Bowden cable 29 provided in this instance is guided for throttle valve actuation. A cam plate B firmly connected to the plate A has a radius that, from idling to full load, varies from a smaller radius $r_{BLL}$ to a larger radius $r_{BVL}$. The cam plate is then engaged by the force F(2) of the opening spring 2, in the present exemplary embodiment via a further plate C, which however is dispensable, since it serves merely for force diversion.

In FIG. 11 the following assumption is made. At a given characteristic curve course F(1) over the spring travel of the throttle valve spring 1, with the initial bias force (in the relaxed state) F(1)vor, the desired summation characteristic curve F(1)+F(2)* should be identical in amount, over the travel, to the bias force F(1)vor, as shown in diagram form in FIG. 11.

Accordingly, the desired opening spring 2 must have a negative characteristic curve course F(2)*, so that the constant course is attained in the summation of the characteristic curves. A real spring, however, is available only with the characteristic curve also shown in the diagram of FIG. 11 and corresponding to F(2).

By means of the apparatus shown in FIG. 12, however, the sum of the moments that act upon the plate A can be kept constant, because the spring force F(2) of the opening spring 2 is transmitted to the cam plate B (initially via a Bowden cable 30 and by wrapping it around the plate C).

Acting upon the plate A, as a function of the travel s, is the force F(1) of the spring 1, while at the travel s2 the force F(2) of the spring 2 acts upon the cam plate B. These forces are shown in FIG. 13 for the idling position.

Accordingly, the force F(1)LL acts at a distance $r_A$ upon the plate A; the force F(2)LL acts upon the plate B at the distance $r_{BLL}$ (radius of the cam plate B at idling).

At a constant radius $r_A$, the constant force F(1)+F(2) should be transmitted by the plate A; that is, the moment at the plate A should be constantly equal to the moment $M_{(A)}$.

Hence, the following must be true:

$$M(A) = F(2) \cdot r_B - F(1) \cdot r_A.$$

For idling, it is for instance true that $$M(A) = F(2)LL \cdot r_{BLL} - F(1)LL \cdot r_A.$$

while for full load, $$M(A) = F(2)VL \cdot r_{BVL} - F(1)VL \cdot r_A.$$

It is therefore possible for the force F(2) to be furnished by the spring 2 over the travel s2 to have the course shown in FIG. 14; that is, with the cam plate configuration of FIG. 12, it is possible to use a real tension spring having the characteristic curve course of spring force over spring travel equivalent to F(2), and by means of the resultant negative spring characteristic curve converted via the cam plate, to attain an overal gentle summation characteristic curve as desired.

The spring rates or characteristic curve courses of the throttle valve spring 1 and opening spring 2, which act in the illustrated manner on the plates A and B connected to one another such that the moment at these plates is as a whole constant, cannot be arbitrarily large; in other words, at given spring rates F(1) and F(2) of the springs 1 and 2, the moment M(A) at the plates A and B can be varied, by varying the radius $r_B$, only within certain limits, because the radius $r_B$ cannot be varied arbitrarily. If the radius in a small angular rangeais varied from $r_{B1}$ to $r_{B2}$, as shown in FIG. 15, then the radius $r_{B2}$ must be located "underneath" the tangent of the Bowden cable; that is, $r_{B2} < r_{B1}/\cos(\alpha)$.

By the use of the cam plate, it therefore becomes possible to drop the summed force of the throttle valve spring and the opening spring so far that the force F(3) of the spring 3, 3', 3'' engaging the driving pedal side and likewise acting in the direction of closure of the throttle valve can be dimensioned smaller than when a cam plate is not used. There is also the advantage that less force needs to be expended for adjustment in the ASR or MSR situation.

Finally, it is also possible to attain a gentle summation spring characteristic curve, when a linear adjuster like that schematically shown in FIG. 1 and described above is used, by providing that a negative spring characteristic curve, which in this sense is required here as well, can be accomplished by the use of an (additional) magnet. In this case as well, the required assumed spring force F(2)* shown in the diagram of FIG. 11 must be "converted" by using additional means.

Referring now to FIG. 16 in contrast to the manipulation of the characteristic curve of the spring 2 by means of a cam plate as described above, a magnetic force having a negative characteristic is added in this case. If the magnetic force acts in the direction of an opening of the throttle valve, then a weaker opening spring for the throttle valve can be selected. In any event the difference, represented by dashed lines, between the characteristic curve courses F(2) and F(2)** in FIG. 16 is brought about by the travel-dependent magnetic force.

The linear adjuster 10' of FIG. 17 includes a stator 8a serving as a magnetic short circuit, which is kept stationary and in its interior supports the exciter coil 8'. The armature 5' of this electromagnetic final control element in this exemplary embodiment (in contrast to the preferred embodiment in the schematic illustration of FIG. 1) is not embodied as a permanent magnet; therefore, in the linear adjuster 10' of FIG. 17, the increase in force that as desired is linearly dependent on the exciter current I in the ASR situation is attained by means of a specialized shaping of the armature 5' and stator 8a. The frustoconical embodiment of the armature and the complementary shape in the stator into which the truncated cone of the armature 5' moves assure the linear increase in force; the opening spring 2''' acting in the opening direction acts upon the armature, as in the exemplary embodiment of FIG. 1, and is supported on the permanent-magnet stator 31 of the additional magnetic force storage means 32. The spring plate 12', which presses against one end of the armature 5' and with it forms the disconnect point, is seated in a bore of the armature and is supported by the connecting rod 6', which is pivotably connected to the driving pedal either directly or via a suitable linkage. In this exemplary embodiment, two independent springs 3a, 3b are provided for closing the throttle valve.

The connecting rod 4' leading on to the throttle valve has a permanent magnet armature 33, secured to it, which supports an attached permanent magnet 34. The connecting rod ' is nonmagnetic; the magnetic short circuit takes place via the aforementioned fixed permanent-magnet stator 31.

As can be seen, the operative force brought to bear by the magnetic force storage means and transmitted to the connecting rod 4' and finally to the throttle valve is maximal whenever the armature 33 has moved all the way into the stator 31, or in other words at full load; it becomes increasingly less, the more the armature 33 moves out of range of the stator, or in other words the more the throttle valve moves into the closing position. This characteristic is the reverse in course of the characteristic of the opening spring 2''', the spring force of which increases toward the right, in the plane of the drawing in FIG. 17, with increasing movement of the connecting rod 4', because the spring is being compressed to an increasing extent. The result then is a summation spring characteristic course as shown in FIG. 16; as noted, the opening spring 2'' may be selected to be weaker, so that the characteristic contributed by the magnetic force storage means predominates. In FIG. 16, the force brought to bear by the magnetic force storage means over the spring travel, that is, between LL and VL, is shown with its course shaded in.

The magnetic force/travel course is selected such that at LL, the summation force F(1)+F(2)** is markedly greater than at VL, so that stable triggering of the throttle valve in the ASR mode is possible.

The components in FIG. 17 are shown in the full-load position VL.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An apparatus for actuating the throttle valve of an internal combustion engine disposed in a motor vehicle, having means for its adjustment independently of an intention of the operator thereof, in particular adapted selectively for at least one of drive slip control (ASR) and engine drag moment control (MSR) in said motor vehicle driven by the engine via actuation of a driving pedal (7), a disconnect point being (12/5; 17/18; 17'/18') provided to interrupt a connection with a throttle valve (9), during a course of movement of said driving pedal (7), first, second and third springs having spring forces (F(1); F(2); F(3)) being provided to act on opposite sides of said disconnect point, said spring forces being dimensioned such that the disconnect point is closed during normal driving pedal actuation, an electromagnetic linear adjuster (10) disposed between the disconnect point (12/5; 17/18; 17'/18') and the throttle valve (9) to introduce and maintain a throttle valve movement upon receipt of an ASR or MSR signal, said electromagnetic linear adjuster being operative independently of or counter to the driving pedal positon.

2. An apparatus as defined by claim 1, which includes an exciter coil (8), and said electromagnetic linear adjuster has an armature movably supported in a magnetic field of said exciter coil (8).

3. An apparatus as defined by claim 2, in which said armature of said electromagnetic linear adjuster is a permanent magnet (5), which upon a corresponding variation of a coil current assures a force increase or decrease that is linear thereto.

4. An apparatus as defined by claim 3, in which said disconnect point (12/15) is disposed adjacent to said linear adjuster and is embodied as a permanent magnet (5) which acts as an armature and a spring plate (12) resting thereon, the spring plate being at least indirectly connected to the driving pedal actuation.

5. An apparatus as defined by claim 4, in which said spring plate (12) is pivotably connected to the driving pedal (7) via a linkage (6a).

6. An apparatus as defined by claim 3, in which said first spring is a throttle valve restoring spring (1) provide for returning the throttle valve (9) into an idling position, said second spring is a compression spring (2) disposed toward said throttle valve as viewed from said disconnect point (12/5) and embodied such that a pressure is exerted, counter to said throttle valve restoring spring (1), upon the permanent magnet (5) in the direction of its counterpart component spring plate 12 of the driving pedal linkage, and said third spring is a driving pedal restoring spring (3) associated with a driving pedal linkage (7, 6a, 6, 12) and that said various spring forces (F(3); F(2); F(1)) generated by said springs (3, 2, 1) are dimensioned and balanced with one another such that to attain the ASR function a magnetic force ($F_M$) generated by coil (8) via the control current ($I_{ASR}$) is greater than the sum of spring forces (F(2)+F(1)) of the throttle valve restoring spring (1) and the compression spring (2), which sum is dependent on the throttle valve position, and to attaining an MSR function, the magnetic force ($-F_M$) generated in an opposite direction is greater than a summation characteristic curve of said springs (1, 2, 3).

7. An apparatus as defined by claim 2, which includes a permanent-magnet stator (8a), said armature (5, 5') of said electromagnetic linear adjuster (10, 10') is embodied in a magnet free form, and both the armature (5, 5') and the permanent-magnet stator (8a) are shaped so as to produce a force increase or decrease that is linearly dependent on the exciter current (I) of the exciter coil (8').

8. An apparatus as defined by claim 2, in which said disconnect point (12/15) is disposed adjacent to said linear adjuster and is embodied as a permanent magnet (5) which acts as an armature and a spring plate (12) resting thereon, the spring plate being at least indirectly connected to the driving pedal actuation.

9. An apparatus as defined by claim 8, in which said spring plate (12) is pivotably connected to the driving pedal (7) via a linkage (6a).

10. An apparatus as defined by claim 1, in which said disconnect point (12/15) is disposed adjacent to said linear adjuster and is embodied as a permanent magnet (5) which acts as an armature and a spring plate (12) resting thereon, the spring plate being at least indirectly connected to the driving pedal actuation.

11. An apparatus as defined by claim 10, in which said permanent magnet (5) is disposed inside a coil (8) which exerts a magnetic force ($F_M$) upon said permanent magnet, said coil being supplied with a control current ($I_{ASR}$; $-I_{MSR}$) via a control unit depending upon whether an ASR or MSR function has been actuated.

12. An apparatus as defined by claim 11, in which said control unit (16) generates a coil current corresponding to the throttle valve position in accordance with wheel sensor signals ($S_R$), engine and vehicle speed signals (nv), and driving pedal and brake pedal position signals ($S_{FP}$, $S_{BP}$).

13. An apparatus as defined by claim 10, in which said spring plate (12) is pivotably connected to the driving pedal (7) via a linkage (6a).

14. An apparatus for actuating the throttle valve of an internal combustion engine disposed in a motor vehicle, having means for its adjustment independently of an intention of an operator thereof, in particular adapted selectively for at least one drive slip control (ASR) and engine drag moment control (MSR) in said motor vehicle driven by the engine via actuation of a driving pedal (7), a disconnect point being (12/5; 17/18; 17'/18') provided to interrupt a connection with a throttle valve (9), during a course of movement of said driving pedal (7), first, second and third springs having spring forces (F(1); F(2); F(3)) being provided to act on opposite sides of said disconnect point, said spring forces being dimensioned such that the disconnect point is closed during normal driving pedal actuation, a rotary adjuster (10, 10') being disposed between the disconnect point (12/5; 17/18; 17'/18') and the throttle valve (9) to introduce and maintain a throttle valve movement upon receipt of an ASR or MSR signal, said rotary adjuster being operative independently of or counter to the driving pedal position.

15. An apparatus as defined by claim 14, in which said rotary adjuster comprises first and second elements (17, 18; 17', 18'; 17'', 18'') disposed adjacent one another and connected form-fittingly with one another in one rotational direction via cam-like protrusions (20, 21), wherein a rotational movement of said first element is effected from said driving pedal and a rotational movement of said second element is effected either in normal operation by said first element actuated by the driving pedal, or in an ASR situation by the action of the rotary adjuster, with disconnection from the latter element.

16. An apparatus as defined by claim 15, in which said elements comprise levers.

17. An apparatus as defined by claim 15, in which said elements comprise cam plates.

18. An apparatus as defined by claim 15, in which said first and second elements are mounted in common on a shaft, said first elements being seated loosely on said shaft (19') while said second element is connected to the throttle valve via a linkage or a Bowden cable and is firmly seated on said shaft, and said shaft is connected to an electric drive motor (27) via a coupling (28) that is activated in the ASR or MSR situation.

19. An apparatus as defined by claim 15, in which said third and second springs function as tension springs and engage said first and second elements.

20. An apparatus for actuating the throttle valve of an internal combustion engine disposed in a motor vehicle, having means for its adjustment independently of an intention of an operator thereof, in particular adapted selectively for at least one of drive slip control (ASR) and engine drag moment control (MSR) in said motor vehicle driven by the engine via actuation of a driving pedal (7), a disconnect point being (12/5; 17/18; 17'/18') provided to interrupt a connection with a throttle valve (9), during a course of movement of said driving pedal (7), a throttle valve spring, an opening spring and a closing spring having spring forces (F(1), F(2), F(3)), respectively, being provided to act on opposite sides of said disconnect point, opening spring (2, 2', 2'', 2''') is assigned to negative spring characteristic curve course to attain a gentle summation characteristic curve together with said throttle valve spring (1), said spring forces being dimensioned such that the disconnect point is closed during normal driving pedal actuation, an actuating element (10, 10') being disposed between the disconnect point (12/5; 17/18; 17'/18') and the throttle valve (9) to introduce and maintain a throttle valve movement upon receipt of an ASR or MSR signal, said actuating element being operative independently of or counter to the driving pedal position.

21. An apparatus as defined by claim 20, in which a cam plate (B) that varies its radius over the spring travel is associated with said opening spring to attain a negative spring characteristic curve course of the opening spring (2', 2''), said cam plate (B) transmitting the moment exerted upon it by said opening spring (2', 2'') to a plate (A) connected to said cam plate (B) in a manner fixed against relative rotation, with a constant or variable radius and said plate (A) is connected to the throttle valve actuation via an actuation device (29).

22. An apparatus as defined by claim 21, in which said opening spring (2', 2'') is connected to the cam plate (B) via a Bowden cable connection (30) that is diverted via a further plate (C).

23. An apparatus for actuating the throttle valve of an internal combustion engine disposed in motor vehicle, having means for its adjustment independently of an intention of an operator thereof, in particular adapted selectively for at least one drive slip control (ASR) and engine drag moment control (MSR) in said motor vehicle driven by the engine via actuation of a driving pedal (7), a disconnect point being (12/5; 17/18; 17'/18') provided to interrupt a connection with a throttle valve (9), during a course of movement of said driving pedal (7), first, second and third springs having spring forces (F(1); F(2); F(3)) being provided to act on opposite sides of said disconnect point, said spring forces being dimensioned such that the disconnect point is closed during normal driving pedal actuation, an actuating element (10, 10') being disposed between the disconnect point (12/5; 17/18; 17'/18') and the throttle valve (9) to introduce and maintain a throttle valve movement upon receipt of an ASR or MSR signal, said actuating element being operative independently of or counter to the driving pedal position, and for attaining an overall negative spring characteristic curve course, a magnetic force storage means (32) is associated with biasing elements of said second spring (2''') of a linear adjuster, the biasing elements acting in the opening direction of the throttle valve.

24. An apparatus as defined by claim 23, in which said magnetic force storage means includes a permanent-magnet stator (31), in which with a throttle valve travel adjustment, a permanent-magnet armature (33) having a permanent magnet (34) attached to it is displaceably disposed.

25. An apparatus as defined by claim 24, in which in a full-load position (VL) with the throttle valve opened, said permanent-magnet stator (31) receives said permanent-magnet armature (33) completely, such that the force, originating in the magnetic force storage means, upon the throttle valve adjustment is reduced increasingly in the course of a shift to an idling position (LL) with the throttle valve closed.

26. An apparatus as defined by claim 25, in which said stator (31) of the magnetic force storage means has a frustoconical shape and the associated armature (33) has a correspondingly complementary shape.

27. An apparatus as defined by claim 24, in which said stator (31) of the magnetic force storage means has a frustoconical shape and the associated armature (33) has a correspondingly complementary shape.

28. An apparatus for actuating the throttle valve of an internal combustion engine disposed in a motor vehicle, having means for its adjustment independently of an intention of the operator thereof, in particular adapted selectively for at least one of drive slip control (ASR) and engine drag moment control (MSR) in said motor vehicle driven by the engine via actuation of a driving pedal (7), a disconnect point being (12/5; 17/18; 17'/18') provided to interrupt a connection with a throttle valve (9), during a course of movement of said driving pedal (7), a first spring, an opening spring and a closing spring having spring forces (F(1); F(2); F(3)), respectively, being provided to act on opposite sides of said disconnect point, said spring forces being dimensioned such that the disconnect point is closed during normal driving pedal actuation, a rotary adjuster disposed between the disconnect point (12/5; 17/18; 17'/18') and the throttle valve (9) to introduce and maintain a throttle valve movement upon receipt of an ASR or MSR signal, said rotary adjuster being operative independently of or counter to the driving pedal position, said rotary adjuster comprises first and second elements (17, 18; 17', 18'; 17'', 18'') mounted in common on a shaft (19') disposed adjacent one another and connected form-fittingly with one another in one rotational direction via cam-like protrusions (20, 21), said first element being seated loosely on said shaft while said second element is connected to said throttle valve via a linkage or a Bowden cable and is firmly seated on said shaft, wherein a rotational movement of said first element is effected from said driving pedal and a rotational movement of said second element is effected either in normal operation by said first element actuated by the driving pedal, or in an ASR situation by the action of the rotary adjuster, with disconnection from the latter element, said shaft is connected to an electric drive motor (27) via a coupling (28) that is activated in the ASR or MSR situation, said closing spring acts in a closing direction of said throttle valve and is disposed toward the driving pedal, said opening spring (2', 2'') acts in a direction of an opening the throttle valve, and said closing and opening springs act as tension springs and engage said elements (17, 18).

29. An apparatus as defined by claim 28, wherein said closing and opening springs act as torsion springs, and are seated on said common shaft (19') and supported in a stationary fashion engage said first and second elements (17', 18').

30. An apparatus as defined by claim 28, in which said elements comprise levers.

31. An apparatus as defined by claim 28, in which said elements comprise cam plates.

* * * * *